May 30, 1939.　　　E. L. FISCHER　　　2,160,014

SOUND FILM APPARATUS

Filed Sept. 21, 1936　　　3 Sheets-Sheet 1

INVENTOR
EDWIN L. FISCHER
BY W. E. Beatty
ATTORNEY

May 30, 1939. E. L. FISCHER 2,160,014
SOUND FILM APPARATUS
Filed Sept. 21, 1936 3 Sheets-Sheet 3
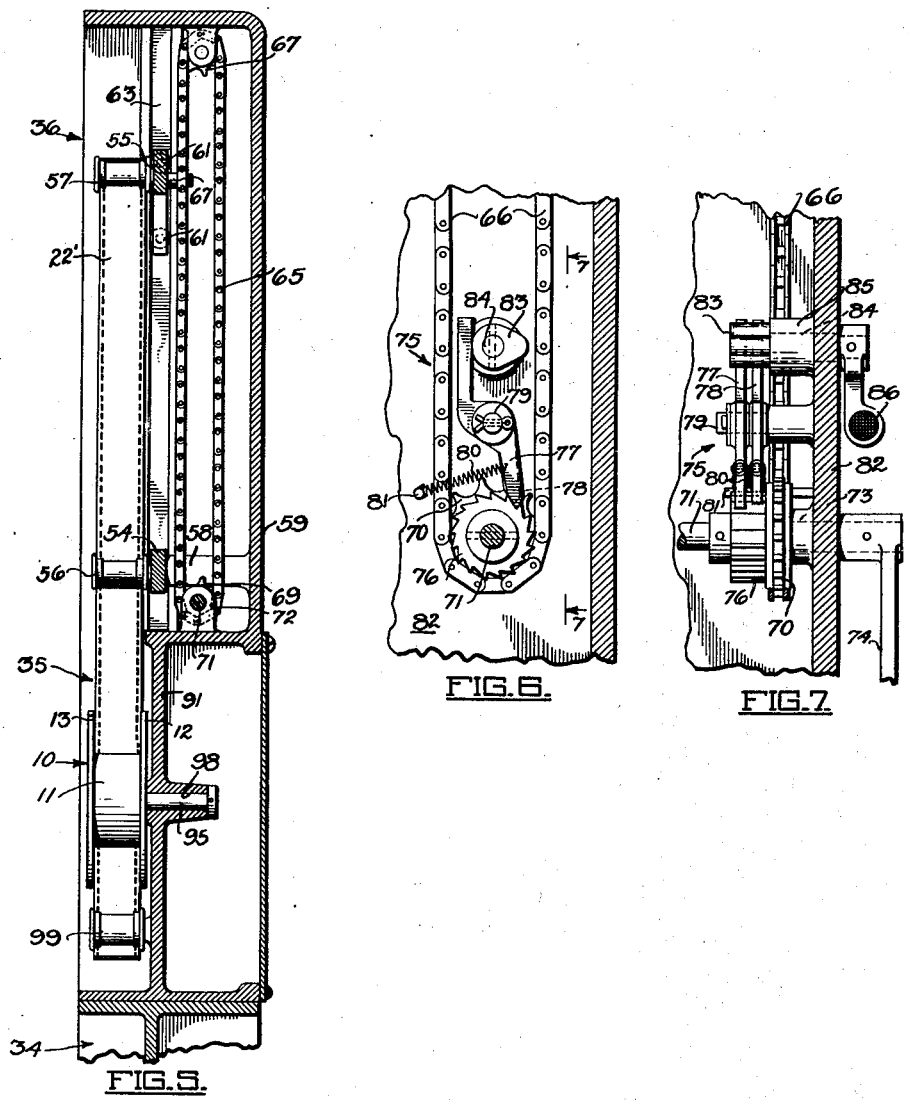
INVENTOR
EDWIN L. FISCHER
BY W E Beatty
ATTORNEY Patented May 30, 1939

2,160,014

UNITED STATES PATENT OFFICE 2,160,014

SOUND FILM APPARATUS

Edwin L. Fischer, Burbank, Calif., assignor, by mesne assignments, to Radio Corporation of America, New York, N. Y., a corporation of Delaware Application September 21, 1936, Serial No. 101,696

7 Claims. (Cl. 274—5)

This invention relates to sound film apparatus and has particular reference to apparatus for handling sound film in the form of a continuous loop.

As is well known, film in a continuous loop is used as a sound record bearer for phonographs etc. wherever particular sounds may be reproduced in re-occurring cycles. One case wherein this type of film is used particularly is in duping or adding to a dialogue sound film such background sound effects as street noise, sound of sea waves, wind, etc. The film, in a continuous loop, is run over and over again through the sound reproducing or duping apparatus, thus economizing in film and its attending expenses.

Due to the fact that the looped end of a continuous film of the usual cellulose base type is easily broken when creased during the winding of the film upon the usual type of film reel it has been the practice heretofore to store continuous loop film by suspending one end of a loop thereof on a peg or by rolling the film into a roll sufficiently loose to prevent creasing of the looped end portion thereof. Both of these methods require considerable space and necessitate great care during handling.

One object of the present invention is to facilitate storing a film in the form of a continuous loop.

Another object of the invention is to permit the use of either a continuous sound film loop or a sound film having free ends in a sound reproducing machine.

Another object of the invention is to facilitate threading a loop of sound film through a sound head and through an adjustable loop frame.

The manner in which these objects are accomplished will be apparent from the following specification taken in conjunction with the accompanying drawings wherein:

Fig. 5 is a sectional elevational view taken along the line 5—5 of Fig. 4.

Fig. 6 is a fragmentary, sectional elevational view of the ratchet mechanism for holding the upper film elevator in any desired position and is taken along the line 6—6 of Fig. 4.

Fig. 7 is an end view of the ratchet mechanism and is taken along the line 7—7 of Fig. 6.

Figure 1:
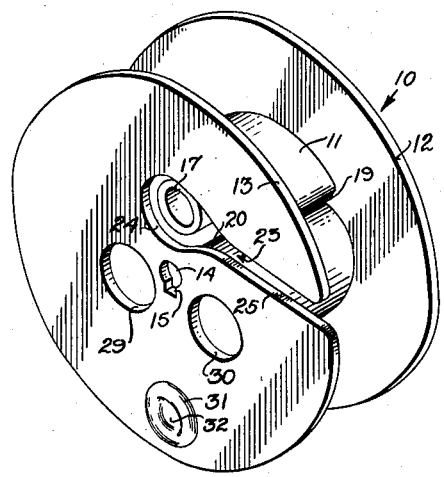
Fig. 1 is a perspective view of a reel for storing a film loop according to the present invention.
Figure 2:
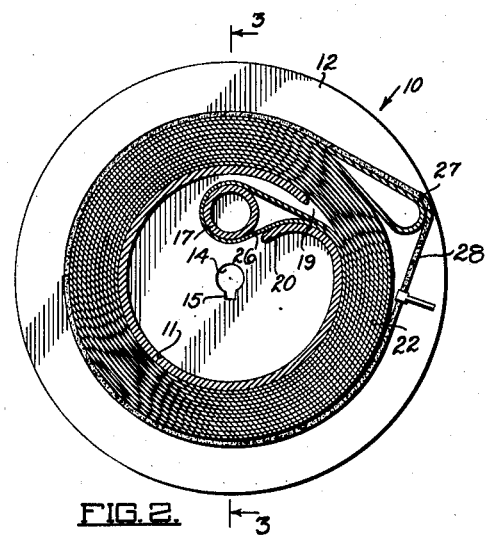
Fig. 2 is a sectional view through the reel and is taken along the line 2—2 of Fig. 3.
Figure 3:
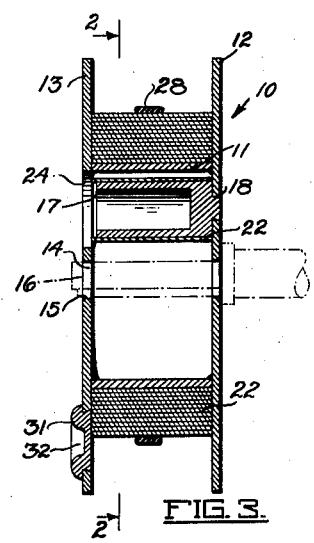
Fig. 3 is a transverse sectional view of the reel and is taken along the line 3—3 of Fig. 2.

Referring to Figs. 1 to 3, inclusive, the continuous loop film reel 10 comprises an annular hub 11 around which a film in the form of a continuous loop is adapted to be wound. Flanges 12 and 13 are suitably secured on either end of hub 11 to guide the film laterally thereon. Centrally located holes 14 having keyways 15 therein permit the reel 10 to be mounted upon a keyed shaft, as shown by the dotted lines 16 of Fig. 3. A stud member 17 is secured at one end to the flange 12 as at 18 and extends transversely with or parallel to the axis of the hub 11 and within the inner periphery thereof. A transverse opening or slot 19 extends the entire length of the hub 11 at a point adjacent the stud member 17. One edge 20 of the hub 11, defining one edge of the opening 19, is bent inwardly in a radius considerably less than the radius of the hub 11 to permit the looped end 26 of a continuous loop film 22 to be passed tangentially thereon from the stud member 17 while being wound upon the hub 11. The flange 13 has an opening or slot 23 therein to permit the film to be passed transversely upon the stud member 17 and into the slot 19. Opening 23 comprises an enlarged opening 24 directly opposite the free end of stud member 17 and a slot-like portion 25 communicating therewith and with the transverse opening 19 and outwardly to the periphery of flange 13.

Although the stud member 17 is shown as being preferably positioned close to the inner periphery of the hub member 11 in order to permit the portion of the film adjacent the inner looped end thereof to be passed or wound upon the hub 11 with te least amount of curvature, it is to be understood that the stud 17 may also be provided coaxially with the axis of the hub 11, or in fact, in any position within the inner periphery of hub 11.

On threading the film upon the reel 10 a looped end portion as at 26 (Fig. 2) is passed transversely through the slot 23, onto the stud member 17 and through the opening 19. The film is then wrapped tangentially upon the inwardly curved portion 20 of hub 11 and thence around the periphery of the hub 11 in the usual spiral manner. In order to hold the outer looped end portion 27 of the film from accidentally unwinding a loose rubber band as at 28 may be passed around the film roll. Preferably the outer end 27 is kept below the periphery of the flanges 12 and 13 to prevent accidental creasing or breaking of the film at this point. In order to permit handling of the film reel within close fitting magazines a pair of finger holes 29 and 30 are provided on the outer flange 13 to permit the fingers of an operator to be inserted therein to handle the reel 10. A button 31 is also secured to the outer flange 13 near the periphery thereof and has a depression 32 therein in the central portion thereof to permit the thumb or fingers of the operator to be inserted therein for manual rotation of the reel if desired. This button 31 prevents the fingers of the operator from extending within the flange 13 and into the path of the film 22 as it is being manually wound or unwound from the hub 11.

Figure 4:
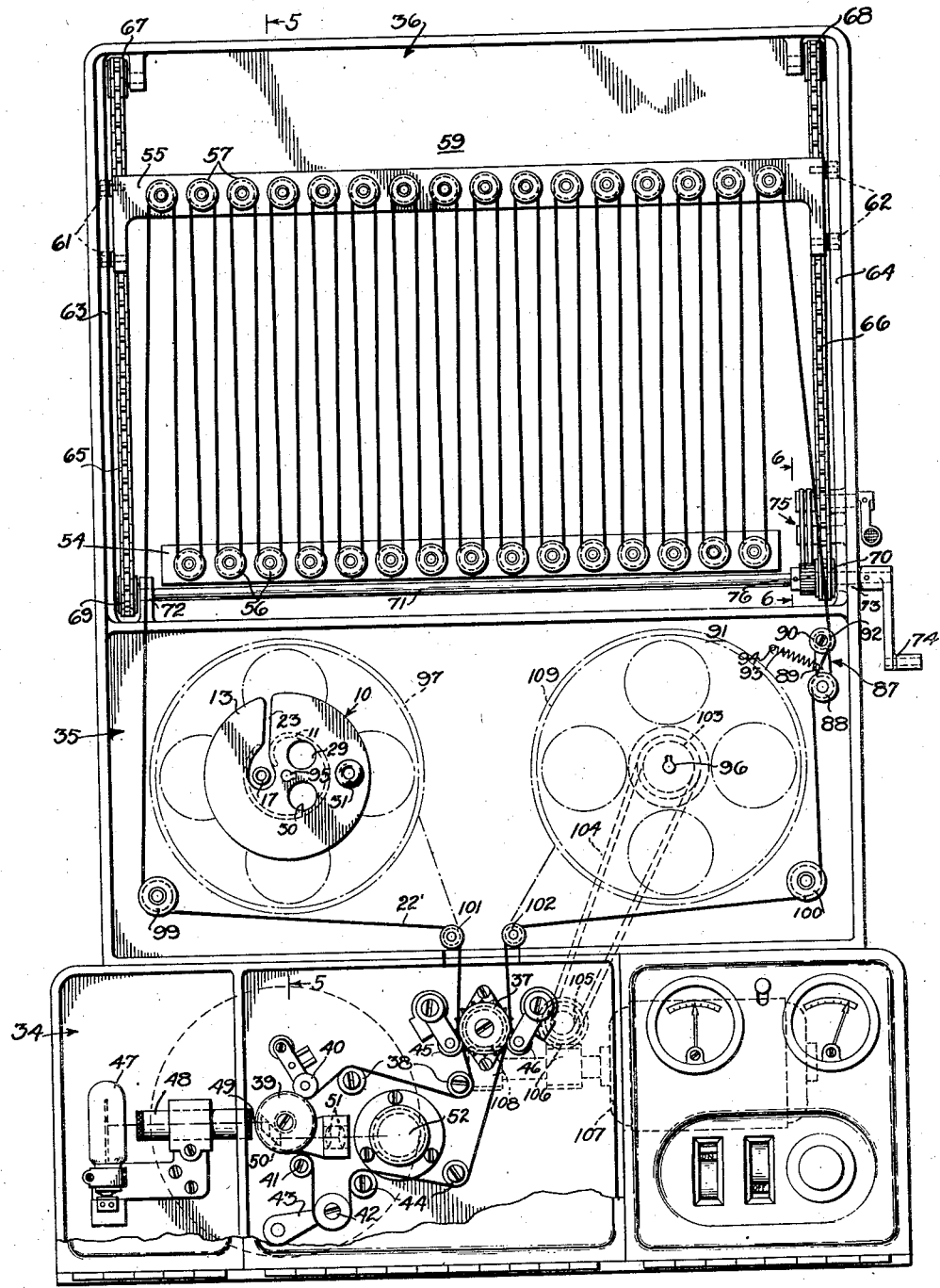
Fig. 4 is an elevational view with parts broken away of a sound film reproducing device of the present invention which is adapted to employ either a continuous loop film or a film having free ends.

Fig. 4 illustrates a sound translating unit for use with either film in the form of a loop film having free ends and which may be employed either for reproducing sound or for duping background sound effects such as wind, street noises, etc., with a dialogue film record.

The apparatus thus illustrated comprises a sound translating unit 34, a magazine compartment 35 and a storage compartment 36 to take up the surplus portion of the loop while the remainder thereof is passing through the translating unit 34.

Unit 34 comprises a driving sprocket 37 which serves both as a supply and a take-up driving means for film passing through the translating unit 34. A film 22' on passing downwardly over the sprocket 37 is led around rollers 38 and over an inertia controlled film drum 39 which engages and supports the edges of the film adjacent the sound track portion thereof to maintain the film at a constant speed as it passes therearound. A pad roller 40 is provided to hold the film 22' in engagement with the drum 39 as it passes thereover. On leaving the drum 39 the film passes around an idler roller 41, a tensioning roller 42 secured to the end of a spring pressed arm 43, thence around rollers 44 and upwardly into engagement with the teeth on the opposite side of the driving sprocket 37. Pad rollers 45 and 46 are provided on either side of the sprocket 37 to hold the film in engagement therewith while passing thereover.

Light from an exciter lamp 47 is projected through a combination slit and lens barrel 48 and onto the film 22' at a point of translation 49 while the film passes over the drum 39. The beam of light thus modulated by the sound track portion of the film 22' as it passes the point of translation 49 is deflected by means of a rhomboid prism element 50 and is focused by means of a pair of objective lenses 51 upon a photoelectric cell 52. The generated or controlled electric currents produced by the photo-electric cell 52 are led to suitable amplifying apparatus (not shown) and thence to either sound reproducing apparatus or duping apparatus, etc., of the usual type. It is to be understood, of course, that any suitable type of sound translating unit may be employed without departing from the spirit of the invention.

The storage compartment 36 comprises a lower fixed spool head 54 and an upper movable spool head or elevator 55. Spool heads 54 and 55 comprise an adjustable loop frame and have sets of spools 56 and 57, respectively, rotatably mounted in staggered relation with each other to permit a continuous loop of film 22' to be passed in a sinuous path therearound. Referring to Fig. 5 the lower spool head 54 is secured to bosses 58 extending from rear wall 59 from the compartment 36. The upper spool head or elevator 55 has a pair of depending legs on either end thereof to which are rotatably secured pairs of guide rollers 61 and 62 (Fig. 4). These pairs of guide rollers 61 and 62 ride within vertically disposed guide ways 63 and 64, respectively. Chains 65 and 66 in the form of continuous loops are secured as at 67 (Fig. 5) to the upper spool head 55 and are supported at their upper looped ends upon freely rotatable sprockets or rollers 67 and 68, respectively, and at their lower looped ends around sprockets 69 and 70 respectively. These lower sprockets 69 and 70 are secured to a shaft 71 rotatably mounted in bearings 72 and 73. A crank 74 is provided to rotate the shaft 71 and thus either raise or lower the upper spool head 55 to any desired position. This arrangement for raising the upper spool head 55 insures that head 55 be raised or lowered in parallel relation to the lower head 54.

A ratchet mechanism 75 is provided in the lower right hand corner of the compartment 36 to hold the spool head 55 in any desired position. Referring to Figs. 6 and 7 this ratchet mechanism 75 comprises a ratchet 76 secured in fixed relation to the shaft 71. A pair of pawls 77 and 78 are pivotally supported upon a horizontally extending stud member 79 for engagement with the teeth of ratchet 76. A spring 80 is secured between each of the pawls 77 and 78 and a pin 81 extending from the side wall 82 of the compartment 36 to urge the pawls into engagement with the ratchet 76. One of the pawls 77 is slightly longer than the other, being on the order of one-half the pitch of the ratchet teeth longer than the pawl 78 to permit a double ratchet movement. A cam 83 is secured in fixed relation with a stub shaft 84 which is rotatably mounted in a bearing 85 provided on the side wall 82. Cam 83 is adapted, when rotated by means of a lever 86, secured to the shaft 84, to engage and move the upwardly extending ends of the pawl members 77 and 78 and thus retract the pawls from engagement with the ratchet 76, if desired.

An automatic tensioning device, generally indicated at 87 is provided in the upper right hand corner of the magazine compartment 35 to prevent undue tension or slack from being applied to the film 22'. This device comprises an idler roller 88 rotatably secured on the end of an arm 89 which is pivoted at 90 to the rear wall 91 of the compartment 35. A second idler roller 92 is rotatably secured to the arm 89 along the pivotal axis therefor. A spring 93 is provided between the arm 89 and a pin 94 extending from the rear wall 91 to urge the roller 88 in a clockwise direction.

The magazine compartment 35 has provided therein in horizontal spaced relation a pair of shafts 95 and 96. Shaft 95 (Fig. 5) is journaled in a bearing 98 provided in the wall 91 of the compartment 35 and serves to rotatably support either the supply reel 97 of a free end film, or the loop film reel 10 while threading the film loop therefrom onto the sets of rollers 56 and 57. Shaft 95 may be provided with a friction arrangement (not shown) to prevent over-running thereof when supporting a supply reel of a free end film.

On threading a continuous film loop through the apparatus the reel 10 is mounted upon the shaft 96 and the upper spool head 55 is lowered by means of the crank 74 to a position directly adjacent the lower head 54. The looped end 27 (Fig. 2) of the film on reel 10 is then threaded in a sinuous path over and around the sets of film rollers 56 and 57. After the film 22′ has been practically unwound from the reel 10 the inner looped end 26 is removed from the stud member 17 of reel 10 and is threaded around the various rollers, the drum and the sprocket in the translating unit 34, through the tensioning device 87 and around idler rollers 99, 100, 101 and 102 in compartment 35. After the continuous loop of film has been threaded through the entire apparatus, upper spool head 55 is raised by means of the crank 74 to remove the slack in the film loop. With reference to Fig. 5 it will be noted that the sets of rollers 56 and 57, the various guide rollers as at 99 and the reel supporting portions of the shafts 95 and 96 are in lateral alignment, thus permitting the use of either continuous loop or free end film as desired.

Shaft 96, adapted to support and drive a take-up reel for a free end film, has secured thereto a pulley 103 which is engaged by a suitable chain or belt 104, driven by a second driving pulley 105. Pulley 105 is driven through a pair of spiral gears 106 by means of motor 107. A second pair of spiral gears 108 also driven by motor 107, imparts a constant speed of rotation to the sprocket 37. A friction coupling (not shown) may be provided on shaft 96 to allow slippage between shaft 96 and pulley 103 to compensate for change in diameter of a roll of film on the take-up reel indicated by the dotted lines 109 when employing a free end film.

Having thus described the invention, what is claimed as new and desired to be secured by Letters Patent is:

1. A sound reproducer comprising a sound film translating unit, a film storage compartment adjacent said unit, a lower stationary spool head in said compartment, an upper movable spool head in said compartment, means for guiding said upper spool head in a vertical direction, a chain on each end of said upper head, a sprocket engaging each of said chains, and means for rotating said sprockets whereby said upper head may be raised or lowered in parallel relation with said lower head.

2. A sound reproducer comprising a sound head, a plurality of spools around which a continuous loop of film is adapted to be wound, an adjustable loop frame having a fixed spool head and a movable spool head, said fixed spool head maintaining substantially one-half of said plurality of spools in fixed alignment and said movable spool head maintaining the remainder of said plurality of spools in a fixed alignment parallel to the alignment of the spools of said fixed spool head means for supporting said adjustable loop frame separated from said sound head, manual means for simultaneously moving all the spools of said movable spool head toward and away from said fixed spool head while maintaining the parallel alignment of the respective spools on said spool heads and means for guiding film from said adjustable loop frame to and from said sound head.

3. A sound reproducer according to claim 2, wherein a storage reel for said continuous loop of film is positioned between said adjustable loop frame and said sound head.

4. A sound reproducer according to claim 2, wherein said film guiding means is adapted to guide the film in a path around said storage reel.

5. A sound reproducer comprising a sound film translating unit, a film compartment adjacent said unit, a stationary spool head in said compartment having a plurality of film spools thereon with their axes in the same plane, a movable spool head in said compartment having a plurality of film spools thereon with their axes in the same plane, said second-mentioned plane being parallel to said first-mentioned plane, means for guiding said movable spool head while maintaining said movable spool head parallel with said stationary spool head, and manual means for moving all of the spools of said movable spool head with respect to all of the spools of said stationary spool head, the distance said movable spool head is moved depending upon the length of a film loop to be accommodated.

6. Sound apparatus comprising a horizontally disposed housing, a compartment immediately above and adjacent said housing, a second compartment above said first compartment, a stationary spool head in said second compartment, a movable spool head in said second compartment, a supply reel in said first compartment for holding a continuous loop of film, the end of said film loop being adapted to be threaded over the spools in said spool heads, and means for separating said spool heads, said separation unwinding said film loop from said supply reel.

7. A sound reproducer for translating a photographic sound record on a continuous loop of film into modulated electrical current comprising a sound record translating unit, means for moving the film longitudinally through said unit, two horizontal series of equally spaced rollers, one of said series of rollers having all their axes in one plane, and the other series of rollers having all their axes in another plane parallel to said first plane, means for raising and lowering one series of said rollers while maintaining parallelism between said planes, and means for manually actuating said raising and lowering means.

EDWIN L. FISCHER.